(12) United States Patent
Patten et al.

(10) Patent No.: US 8,959,045 B2
(45) Date of Patent: *Feb. 17, 2015

(54) SYSTEM AND METHOD FOR INFORMATION SHARING ACROSS SECURITY BOUNDARIES

(71) Applicant: Northrop Grumman Systems Corporation, Los Angeles, CA (US)

(72) Inventors: Terry Patten, Oak Hill, VA (US); Martin Thurn, Ashburn, VA (US)

(73) Assignee: Northrop Grumman Systems Corporation, Los Angeles, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/083,228

(22) Filed: Nov. 18, 2013

(65) Prior Publication Data

US 2014/0081900 A1    Mar. 20, 2014

Related U.S. Application Data

(63) Continuation of application No. 12/461,649, filed on Aug. 19, 2009, now Pat. No. 8,589,333.

(60) Provisional application No. 61/136,212, filed on Aug. 19, 2008.

(51) Int. Cl.
*G06F 17/00* (2006.01)
*G06N 5/02* (2006.01)
*H04L 29/06* (2006.01)

(52) U.S. Cl.
CPC .............. *G06N 5/02* (2013.01); *H04L 63/0263* (2013.01)
USPC .......................................................... 706/46

(58) Field of Classification Search
USPC .......................................................... 706/46
See application file for complete search history.

(56) References Cited

U.S. PATENT DOCUMENTS

| | | | |
|---|---|---|---|
| 7,516,155 B2 * | 4/2009 | Ivan et al. .............................. | 1/1 |
| 7,587,368 B2 | 9/2009 | Feisher | |
| 7,805,673 B2 | 9/2010 | der Quaeler et al. | |
| 8,000,530 B2 | 8/2011 | Jiang | |
| 8,000,956 B2 | 8/2011 | Brun | |
| 2002/0010679 A1 | 1/2002 | Feisher | |
| 2003/0182310 A1 | 9/2003 | Charnock et al. | |
| 2006/0053170 A1 | 3/2006 | Hill et al. | |

* cited by examiner

*Primary Examiner* — Jeffrey A Gaffin
*Assistant Examiner* — David H Kim
(74) *Attorney, Agent, or Firm* — Andrews Kurth LLP; Sean S. Wooden; Matthew J. Esserman

(57) ABSTRACT

A system and method for sharing information across security boundaries including a server for sharing information between networks. The method for includes receiving data structured as semantic statements, retrieving a set of rules and ontology, processing a semantic statement from data with rules and ontology, determining whether the semantic statement is consistent with rules and ontology, and determining a fact that gives rise to an inconsistency if the semantic statement is inconsistent. The method further includes removing the fact that gives rise to the inconsistency and releasing data when the semantic statement is consistent with rules and ontology.

19 Claims, 6 Drawing Sheets

SYSTEM AND METHOD FOR INFORMATION SHARING ACROSS SECURITY BOUNDARIES

RELATED APPLICATIONS

This application is a continuation of U.S. patent application Ser. No. 12/461,649, filed Aug. 19, 2009, issuing on Nov. 19, 2013 as U.S. Pat. No. 8,589,333, which claims benefit of priority to from U.S. Provisional Patent Application No. 61/136,212, filed Aug. 19, 2008, both of which are hereby incorporated herein by reference in their entirety.

BACKGROUND

The sharing of information is often hindered by security policies that govern the release of information. Even if some policies allow a person or organization to receive a piece of information, other policies may forbid releasing the information because the information may be embedded within more sensitive information, e.g. within a sensitive document. The policies may also forbid releasing the information because the information resides on a sensitive network and the information is not explicitly marked as being releasable, or because the information is labeled as being more sensitive than it actually is. Typically, in such situations, the information can only be released through a manual process that involves a qualified human reviewing the information and redacting any sensitive information prior to releasing the information. Human review is required for releasability decisions because current automatic mechanisms cannot reliably interpret most types of information. Computational approaches can match strings and look for sensitive words, but they cannot process the semantics or meaning of the information. However, human review is too slow and too expensive to allow large amounts of information to be shared. Existing methods for sharing information based on semantics, such as the methods described in "Security Guards for the Future Web" a Mitre technical report by Dr. Nancy Reed ("Mitre"), use logical reasoning and ontology to determine what information is releasable. For example, Mitre uses queries to extract information to be shared or passed through a security guard. Any information that is not extracted is not released.

Accordingly, there is a need for an automatic mechanism for information sharing that can, with high assurance, process the semantics of the information and make correct releasability decisions.

SUMMARY

An advantage of the embodiments described herein is that they overcome the disadvantages of the prior art. Another advantage of certain embodiments is information sharing.

These advantages and others are achieved by a system for sharing information across security boundaries including a server for sharing information between networks. The server includes a processor and memory including instructions for receiving data structured as semantic statements, retrieving a set of rules and ontology and processing a semantic statement from data with rules and ontology. The instructions further include determining whether the semantic statement is consistent with rules and ontology, determining a fact that gives rise to an inconsistency if the semantic statement is inconsistent, removing the fact that gives rise to the inconsistency and releasing data when the semantic statement is consistent with rules and ontology.

These advantages and others are also achieved by a method for sharing information across security boundaries including receiving data structured as semantic statements, retrieving a set of rules and ontology, processing a semantic statement from data with rules and ontology, determining whether the semantic statement is consistent with rules and ontology, and determining a fact that gives rise to an inconsistency if the semantic statement is inconsistent. The method further includes removing the fact that gives rise to the inconsistency and releasing data when the semantic statement is consistent with rules and ontology.

Another embodiment of a method for sharing information across security boundaries includes receiving data structured as semantic statements, retrieving a set of rules and ontology and aggregation history, processing a semantic statement from data with rules, ontology and aggregation history and determining whether the semantic statement is consistent with rules, ontology, and aggregation history. The method further includes determining a fact that gives rise to an inconsistency if the semantic statement is inconsistent and removing the fact that gives rise to the inconsistency and releasing data when the semantic statement is consistent with rules, ontology and aggregation history.

DESCRIPTION OF THE DRAWINGS

The detailed description will refer to the following drawings, wherein like numerals refer to like elements, and wherein.

DETAILED DESCRIPTION

The system and method for sharing information across security boundaries described herein represents both the information to be released and the policies upon which releasability decisions are made in a well-defined, formal semantic representation. The formal semantic representation allows releasability decisions to be made automatically based on the meaning of the information. In some embodiments, the formal semantic representation allows decisions that are mathematically provably correct to be made by an automatic theorem prover, providing high assurance that correct decisions are being made.

Figure 1B:
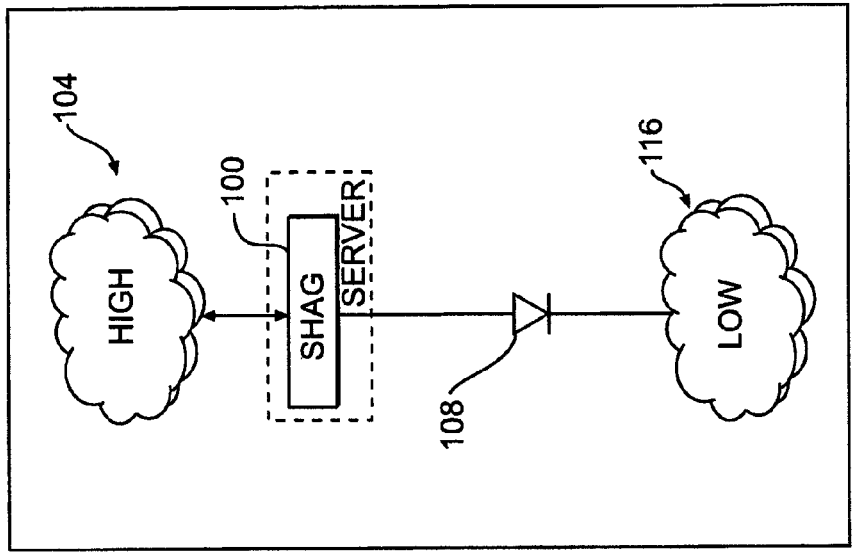
FIGS. 1A-B illustrate embodiments of systems for sharing information across security boundaries.
Figure 1A:
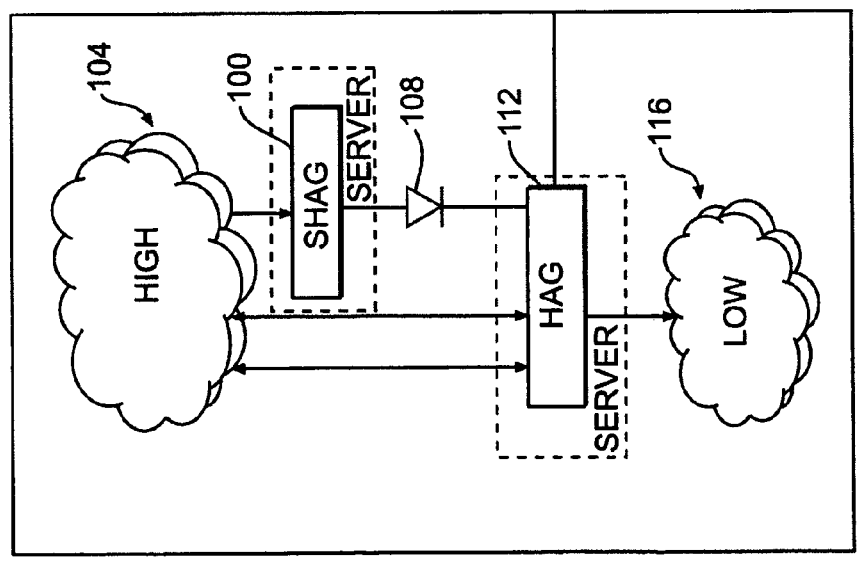

FIG. 1A shows an embodiment of a system for sharing information across security boundaries or Semantic High Assurance Guard ("SHAG") 100 that makes releasability decisions while relying on an existing High Assurance Guard (HAG) 112 to actually perform the physical transfer of the information from a high-security network 104 to a target network 116, e.g., a low security network 104. A system that checks the semantics of information against policies using a theorem prover may be termed a Semantic High Assurance Guard ("SHAG"). Embodiments of the SHAG 100 include an automatic theorem-prover. An automatic theorem-prover may be a computer program that proves mathematical theorems. For example, an automatic theorem prover may show that a statement is a logical consequence of a group of statements. An embodiment may involve the SHAG 100 adding security labels required by the HAG 112 to the releasable information. In this embodiment, the SHAG 100 releases information to the HAG 112 through a one-way transfer mechanism 108 to prevent any possibility of subversion through the HAG 112 or target network 116. The HAG 112 may reside at a physical security boundary between the secure network 104 and the target network 116. The one-way transfer mechanism 108 may be a data diode, such as a fiber optic cable modified to send and receive transceivers in one direction. The SHAG 100, and HAG 112, may be embodied as software programs, modules, routines, etc. running on a general purpose computer, or as devices or other hardware, specifically programmed to perform the methods described herein. The SHAG 100 and HAG 112 may include instructions, stored in memory and for execution by a processor, to perform the methods described herein. In addition, in this embodiment, the SHAG 100 and HAG 112 may be software programs that each reside on servers.

FIG. 1B shows an embodiment where the SHAG 100 sends information directly to the target network from another network 104. This embodiment also involves the SHAG 100 releasing information through a one-way transfer mechanism 108 to prevent any possibility of subversion through the target network 116. The transfer mechanism 108 may reside at a physical security boundary between the secure network 104 and the target network 116. In this embodiment, the SHAG 100 may be a software program that resides on a server.

Figure 2:
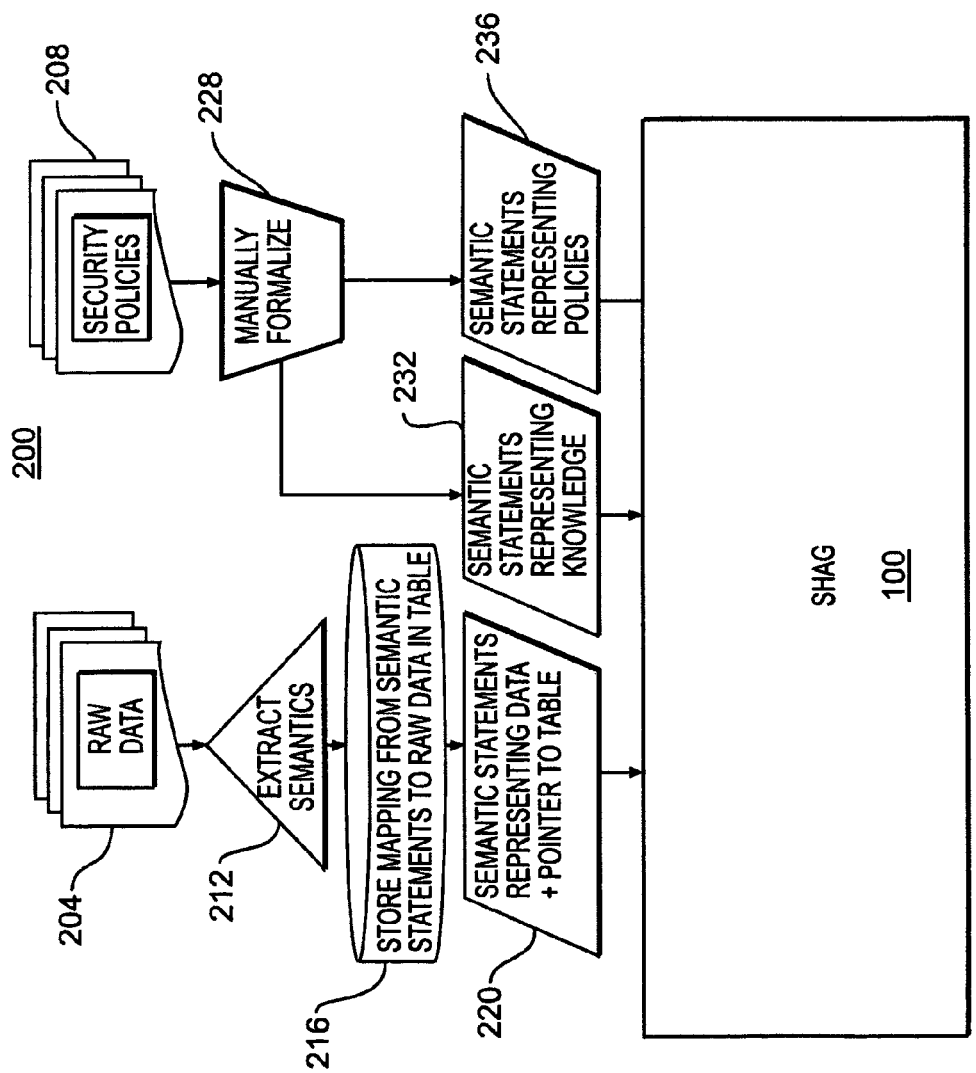
FIG. 2 is a diagram illustrating an embodiment of a method and system for sharing information across security boundaries.

FIG. 2 is a diagram of an embodiment of method 200 for sharing information across security boundaries in which a theorem prover (not shown) is being used to make binary releasability decisions. In an embodiment, raw data or information from a secure network is retrieved or received, block 204. Semantic statements representing the raw data are extracted from the raw data, block 212. A mapping (pointer) from the semantic statements to the raw data, is generated and, e.g., stored in a table or data structure, block 216. The semantic statements representing the raw data, along with the pointers to the table, are provided to the SHAG 100, block 220. Steps 204-220 can be done manually (i.e., a human operator) or automatically. Some steps of 204-220 may be done manually while others may be done automatically.

In the method 200, security policies are retrieved or received, block 208, and are manually formalized, block 228, into logic statements and separated into semantic statements representing knowledge and semantic statements representing policies. The semantic statements representing knowledge may be in the form of ontologies. The semantic statements representing policies may be rules. The semantic statements representing knowledge and policies are provided to the SHAG 100, blocks 232 and 236.

The SHAG 100 checks the semantics of the information and therefore does not require any prior security assessment or explicit security markings. This is an advantage since security markings are often obsolete, incorrect, or missing.

While most information that needs to be shared does not have well-defined formal semantics, some does (e.g. information in a relational database with a semantic schema, or information in a semantic triple store). Techniques are becoming available for converting information into well-defined semantic representations. For instance, software designed for information-extraction may extract well-defined semantics from unstructured text. In cases where the semantic information is automatically derived from other data, it may include a non-descript reference back to the original sources so that the semantic information can be validated by a person with appropriate accesses to the original data, if necessary. Providing a pointer back to the original sources also allows the discovery of those sources by people or organizations that would not otherwise be aware of their existence, giving them the opportunity to request access to the material or to request redacted versions of the material.

Examples of well-defined formal semantic representations are the Web Ontology Language (OWL) and first-order predicate logic. Well-defined inference mechanisms can be applied to these semantic representations allowing the system and method for information sharing not only to determine whether the information at hand is directly sensitive, but also to determine whether any sensitive information can be inferred from the information at hand. This is important because many security policies are written in terms of what the information reveals, where revealed information would include information that can be inferred from the released information and relevant general knowledge. The relevant general knowledge is heavily constrained by the limited semantic scope of the input and the specific semantic issues addressed by the security policies, making it practical to provide an automatic inference engine with the knowledge required to make all the necessary inferences.

In an embodiment, an automatic theorem prover (not shown in FIG. 2) is used within the SHAG system 100 to determine the releasability of data. The use of a theorem prover allows releasability decisions to be based on formal mathematical proofs, which may provide higher levels of assurance than other inference mechanisms. In particular, the formal design and verification provided by an automatic theorem prover could facilitate a high-assurance evaluation of the information sharing system since formal design and verification are the distinguishing criteria for high assurance (e.g., EAL7 in the Common Criteria framework).

In an embodiment, the automatic theorem prover may be a sound and complete OWL reasoner. Such reasoners are designed to formally check the consistency of ontologies. For example, if the information and policies are both represented in OWL, the reasoner can formally determine if releasing the information is mathematically consistent with the policies. In addition, the consistency of policies can be checked. Releasability decisions depend on the structure of the security framework. A common situation is the presence of several networks, each of which is a separate security domain. In this case, a problem is enforcing policies that govern what information can flow from a particular source network to a particular destination network. Mechanisms that enforce such policies are cross-domain solutions or guards. Current guards merely perform syntactic checks on information flowing between networks, and therefore typically require the information to have explicit security markings. The SHAG system 100 differs from current guards in important ways. For example, the rules or policies used by the SHAG system 100, in processing data prior to sharing across security boundaries, are written to describe what data is not allowed to be released in contrast to current system in which rules are written to describe what is allowed to be released. In addition, the SHAG system 100 uses a complete theorem prover to redact non-releasable data, in contrast to a simple inference engine as used in current systems. In current guards, releasability policies were written by describing what is allowed to be released (rather than what is not allowed). Current guards utilize a simple forward-chaining transitivity inference engine to follow subclass relationships within an ontology. The SHAG system 100 is made possible by the realization that if the rules are structured in a certain way, a theorem prover can be used to perform the redaction. In the SHAG system 100, rules and the ontologies are created to trigger a logical inconsistency whenever a rule is violated by data. The theorem prover detects logical inconsistency in a reliably correct way.

In another embodiment of a system and method for information sharing, a SHAG 100 may be used to enforce security through a single network with multiple levels of security. In such networks, users may have different levels of access and will only be able to access information at or below the level for which they are approved. Typically, access decisions are enforced using some form of labeling of the information to indicate its level of security. From an information-sharing perspective, this is equivalent to the case involving separate networks, but rather than moving information from a high to a low network, the label of the information is being changed from a high (or perhaps missing) value to a low value. The decision mechanism in this case is identical to that used for separate networks, an inference engine that compares semantic information to a semantic representation of the policies. Exemplary embodiments may include assigning labels to rows in a relational database or a triple store using an OWL reasoner to determine which rows or triples are consistent with the policies for which security levels.

In an embodiment where the security framework uses security labels but does not technically implement a multi-level security framework, the same mechanism can be used to assign correct security labels to information according to the relevant policies.

Figure 3A:
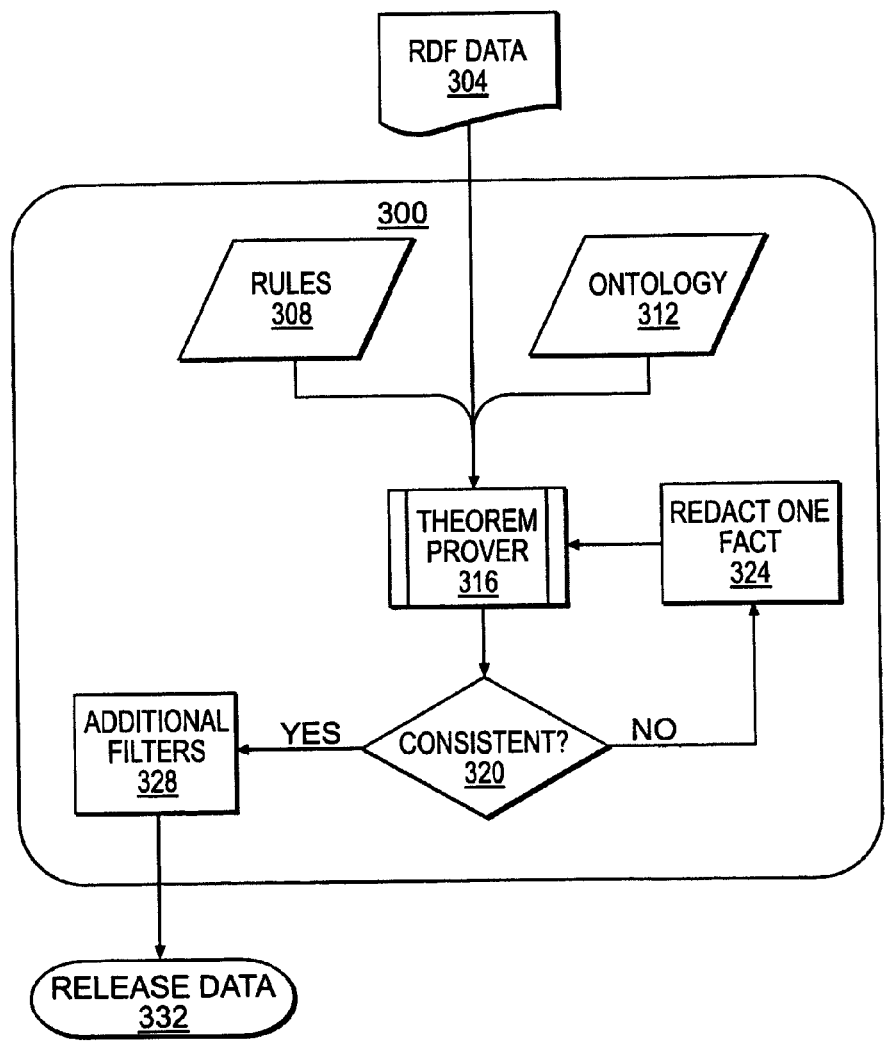
FIG. 3A is a diagram illustrating an embodiment of a method and system for sharing information across security boundaries by redacting non-releasable information.

An alternative is for the system and method to delete (redact) or modify the specific statements that violate the policies and then release the resulting set of statements, perhaps after verifying that the resulting set of statements is in fact releasable. With reference now to FIG. 3A, shown is a diagram illustrating processing of information by an embodiment of a system 300 (e.g., SHAG 100) for sharing information across security boundaries by redacting non-releasable information.

Data 304 for transmission to a target (e.g., a target network) is retrieved or received by system 300. The data 304 may be formatted as Resource Description Framework (RDF) data. System 100 may be sent or may retrieve the data 304 when a request to send the data 304 to a target is received. The data 304 may be represented as logical, e.g., semantic, statements (e.g., prepared from raw data as shown in FIG. 2). Rules 308, including rules and instructions for classifying and otherwise handling facts that may be contained within statements in the data, and an ontology 312 are provided to a theorem prover 316, along with the data 304, for processing. An ontology 312 is commonly known as a specification of concepts and the relationships between them. For example, an ontology may include the relationships of certain people, such as spouses, and may be expressed in Web Ontology Language/Semantic Web Rule Language ("OWL/SWRL"). The theorem prover 316 determines 320 if the data 304 is consistent with the rules 308 and the ontology 312. In an embodiment, each statement in the data 304 is compared to the rules 308 and the ontology 312. If the statement in the data 304 is found to be inconsistent with the rules 308 and the ontology 312, one fact is redacted 324 from the statement based on the determined inconsistency, and the processing is repeated for that statement. Additional facts may be removed and the processing repeated until the processed statement from the data 304 is determined to be consistent with the rules 308 and the ontology 312 or the statement has been eliminated (i.e., all of the facts removed from the statement). This process may be repeated for all of the statements in the data 304.

As shown in FIG. 3A, system 300 may use a process that redacts facts when a releasability policy is violated by statements in the data 304. The process detects logical inconsistencies using ontologies 312 and rules 308. For example, in an intelligence solution, an ontology 312 may contain semantics for classification levels such as "Secret" and "Unclassified", and the ontology 312 may specify that those levels are mutually exclusive (i.e., a piece of data cannot be "Secret" and "Unclassified" at the same time). Rules 308 may provide rules for handling facts within statements in the data 304 and may be expressed in OWL/SWRL for processing by the theorem prover 316. For example, the human-readable existing classification guide statement "Fact of the name of the ship targeted by pirates is Secret" may be translated to a OWL/SWRL rule:

piracy_target(?ship)^ship_has_name(?ship, ?name)→data_has_classification(Secret).

Translating the logic of this OWL/SWRL rule back to English, the rule means "If there is any ship which is the target of piracy, and this ship's name is expressed, assert the fact that the data is Secret." The process used by system 300 starts by assuming that data 304 is releasable or "Unclassified" and it explicitly asserts this fact:

data_has_classification(Unclassified).

Accordingly, data 304 is assumed to be releasable by system 300, and only if a given statement is found to be inconsistent with a rule 308 (i.e., the statement has a fact that is addressed by a rule indicating the fact), will the statement not be releasable. For example, if a statement in the data 304 contains facts about the name of a ship that has been targeted, e.g.:

piracy_target(ship123).
ship_has_name(ship123, "NINA"), the theorem prover 316 will successfully match the above rule against these facts and assert the right-hand-side of the rule, namely data_has_classification(Secret). At this point, the theorem prover 316 detects an inconsistency, because the statement is assumed to be releasable (Unclassified) but matches a rule that indicates something in the statement is not-releasable (Classified), which the theorem prover determines is mutually exclusive, as indicated by the ontology 312. The data is mutually exclusive because the statement is asserted to be both Unclassified and Secret. The statement is asserted to be Unclassified because all data is initially assumed to be unclassified and the statement is determined to be Secret because the rule matched. The theorem prover 316 reports this condition to system 300, along with the fact or set of facts that leads to the inconsistency. System 300 chooses the most specific fact (in this case ship_has_name(ship123, "NINA")) and redacts it from the data set 324. Once that fact is redacted, the above rule can no longer be successfully matched to the statement, no logical inconsistency exists, and the remaining data in the statement can be released.

With continuing reference to FIG. 3A, if the statements in the data 304 are found to be consistent with the rules 308 and the ontology 312, additional filters 328 may be applied to the data 304. These additional filters 328 may clean up semantic statements in the data 304 to prevent the release of data that the theorem prover 316 determines to be logically consistent but a human might infer to be non-releasable. For example, in the ship name example, redacting the fact "piracy_ship(ship123)" is mathematically sufficient to prevent the logical inconsistency and allow the remaining fact "ship_has_name (ship123, "NINA")" to be released. Unfortunately, a human seeing any ship name in the context of piracy information, even though the ship is not explicitly said to be the target, might guess that the named ship is the target. The additional filters 328 detect all such logical "disconnects" and simply redact the related facts from the data. After applying the additional filters 328, the data is released 332.

Figure 3B:
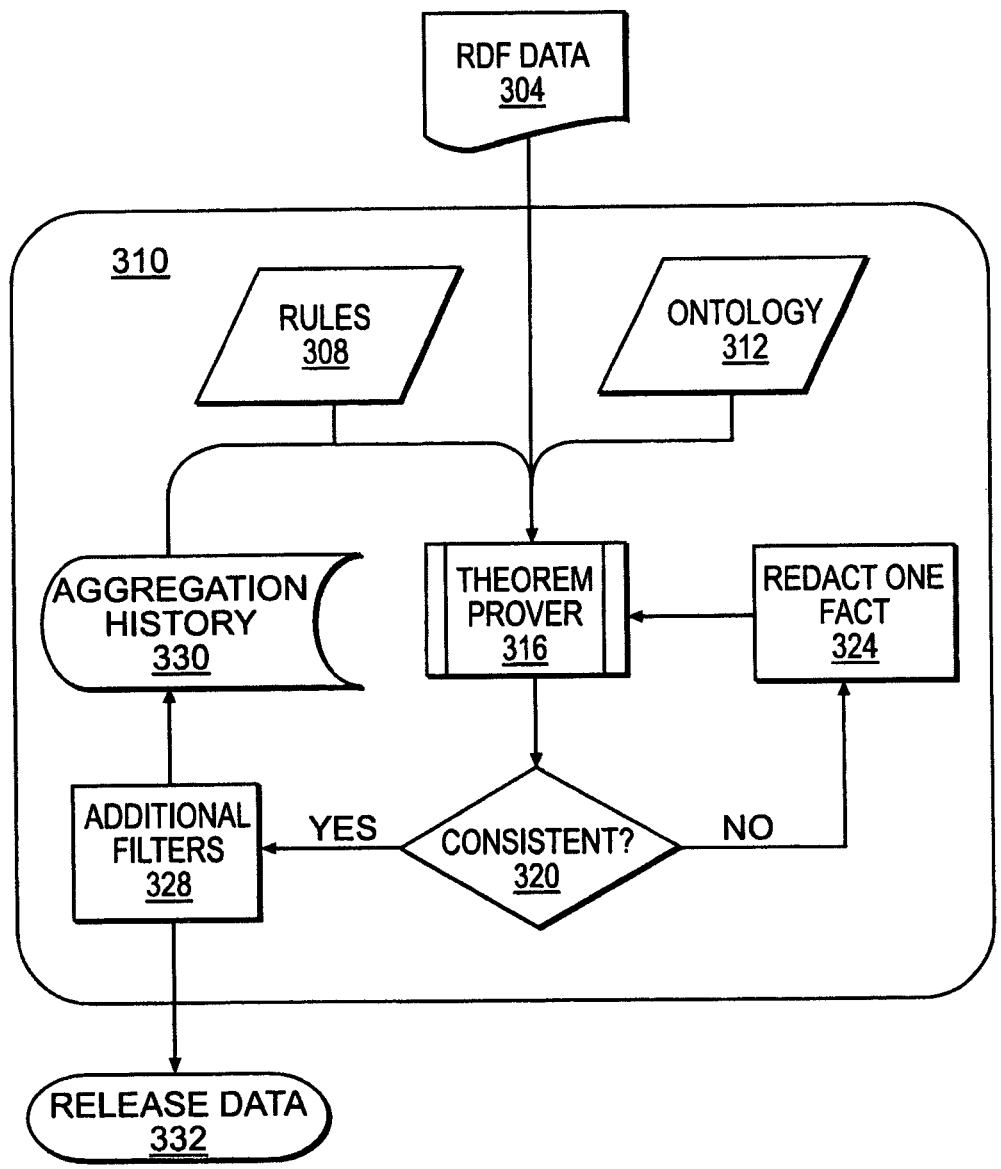
FIG. 3B is a diagram illustrating an embodiment of a method and system for sharing information across security boundaries.

With reference now to FIG. 3B, shown is a diagram illustrating processing of information by another embodiment of a system 300 (e.g., SHAG 100) for sharing aggregated information across security boundaries. An issue that arises when making releasability decisions on small sets of semantic statements is the aggregation problem or mosaic problem. The aggregation problem occurs when, as in a tile mosaic, individual pieces reveal nothing, but many pieces viewed together reveal a meaningful pattern. Current guards apply rules to the data in isolation from other data, which make current guards especially liable to be affected by the aggregation problem. The system and method for information sharing described has been described in terms of releasing a set of semantic statements based on whether releasing that set of semantic statements is consistent with the relevant policies. There is a danger, however, that while that set of semantic statements may be releasable according to the policies, that set together with other already-released information may reveal information that violates policies. Unfortunately, human review is not an effective way to address the aggregation problem since it is unlikely that that same human will be reviewing all the information to be released, and each human reviewer typically has no way of knowing what other reviewers have released. As a result, the aggregation problem is a major security concern and a hindrance to information sharing.

With continuing reference to FIG. 3B, data 304 for transmission to a target (e.g., a target network) is retrieved or received by system 310. The data 304 may be formatted as Resource Description Framework (RDF) data. System 100 may be sent or may retrieve the data 304 when a request to send the data 304 to a target is received. The data 304 may be represented as logical, e.g., semantic, statements (e.g., prepared from raw data as shown in FIG. 2). Rules 308, including rules and instructions for classifying and otherwise handling facts that may be contained within statements in the data, and an ontology 312 are provided to a theorem prover 316, along with the data 304, for processing. The theorem prover 316 determines 320 if the data 304 is consistent with the rules 308 and the ontology 312. In an embodiment, each statement in the data 304 is compared to the rules 308 and the ontology 312. The theorem prover 316 also reads the aggregation history 330 from a database or data structure. If the semantic statements are found to be inconsistent with each other or with the statements read from the aggregation history 330, one fact is redacted 324 and the processing is repeated for that statement until the semantic statements are consistent. If the semantic statements are found to be consistent, additional filters 328, such as those described above, are applied to the data. After applying the additional filters 328, the data is added to the aggregation history 330, and the data is released 332.

The embodiment of system 310, described here provides a solution to the aggregation problem. Since releasability decisions are made automatically, and since the same mechanism is making all the decisions, it is possible and practical to consider the history of past information releases when making releasability decisions. The automatic theorem prover may be able to infer that sensitive information can be inferred from the information to be released in conjunction with information that has already been released, and therefore block the release of the information. In an embodiment, it may be necessary to restrict the historical information considered to some fixed number of semantic statements or to some fixed window of time.

Figure 4:
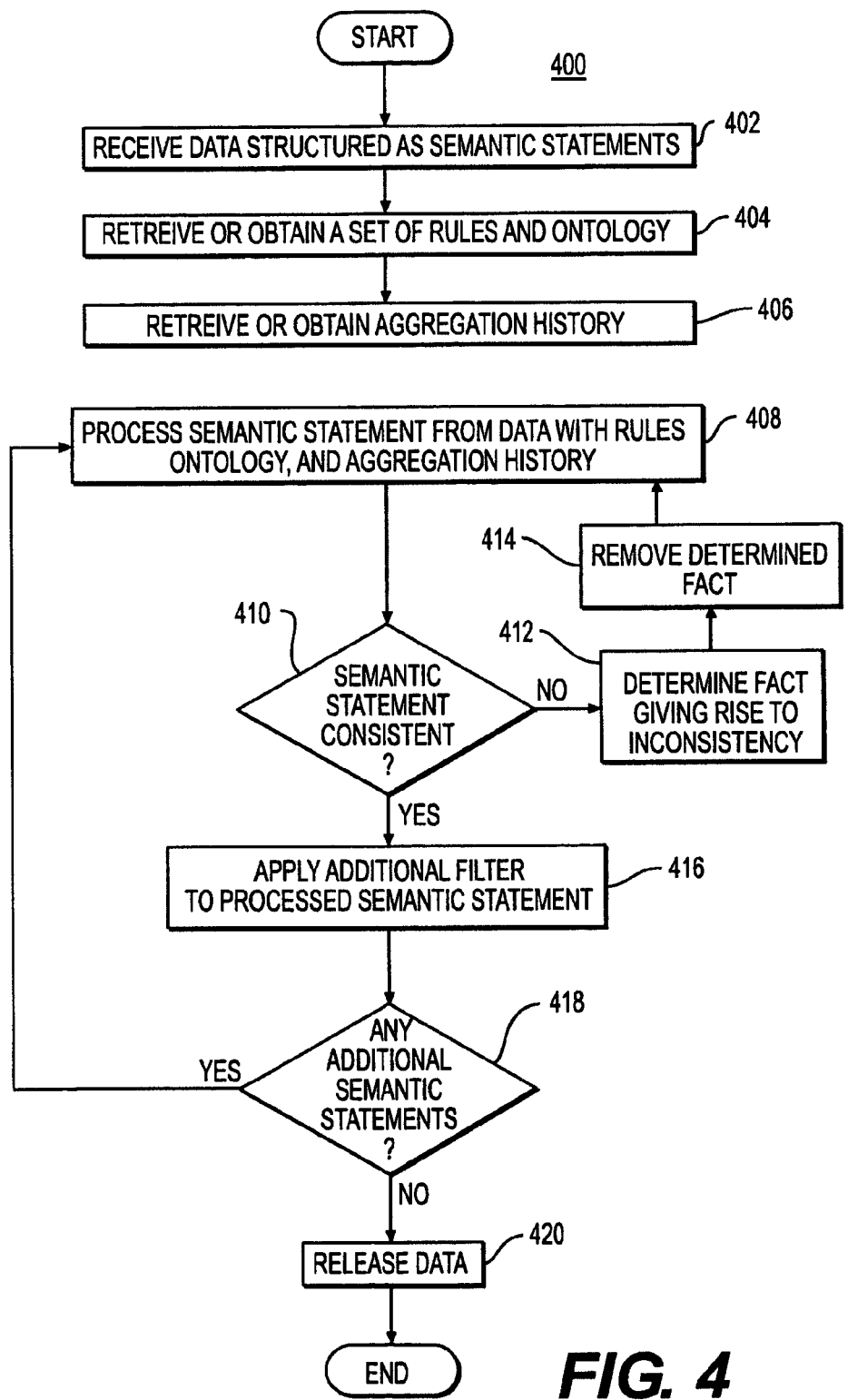
FIG. 4 is a flowchart illustrating an embodiment of a method for sharing information across security boundaries.

With reference now to FIG. 4, shown is a flowchart illustrating an embodiment of a method 400 for sharing information across security boundaries. Method 400 may be executed by system 300 or 310 (e.g., a SHAG 100) as described above. The method 400 receives data structured as semantic statements, block 402. As described above, the data may be formatted in RDF format. A set of rules, which may include rules and instructions for classifying and otherwise handling facts that may be contained within the semantic statements, and an ontology, may be retrieved or otherwise obtained, block 404. The rules and ontology may be structured in OWL/SWRL. Optionally, an aggregation history may also be retrieved or obtained, block 406. A semantic statement from the data is processed with the rules, ontology, and, optionally, the aggregation history, block 408. If the semantic statement is determined, block 410, to not be consistent with the rules, ontology and, optionally, aggregation history, as described above, a fact giving rise to the inconsistency is determined, block 412, and removed, block 414. The processed semantic statement is re-processed, repeating 408-414, until the semantic statement is consistent with the rules, ontology and, optionally, aggregation history, or eliminated (statement is eliminated when all facts are removed; an eliminated statement is, by nature, consistent with rules, etc.).

If the semantic statement is determined, block 410, to be consistent with the rules, ontology and, optionally, aggregation history, additional filters, as described above, may be applied, block 416. If there are additional semantic statements in the data, block 418, the above process is repeated, repeating 408-416. Once all the semantic statements in the data have been processed, the processed data (i.e., the consistent semantic statements) may be released, block 420. Optionally, semantic statements may be released one at a time or in groups, once processed, rather than after processing all semantic statements as shown here.

Figure 5:
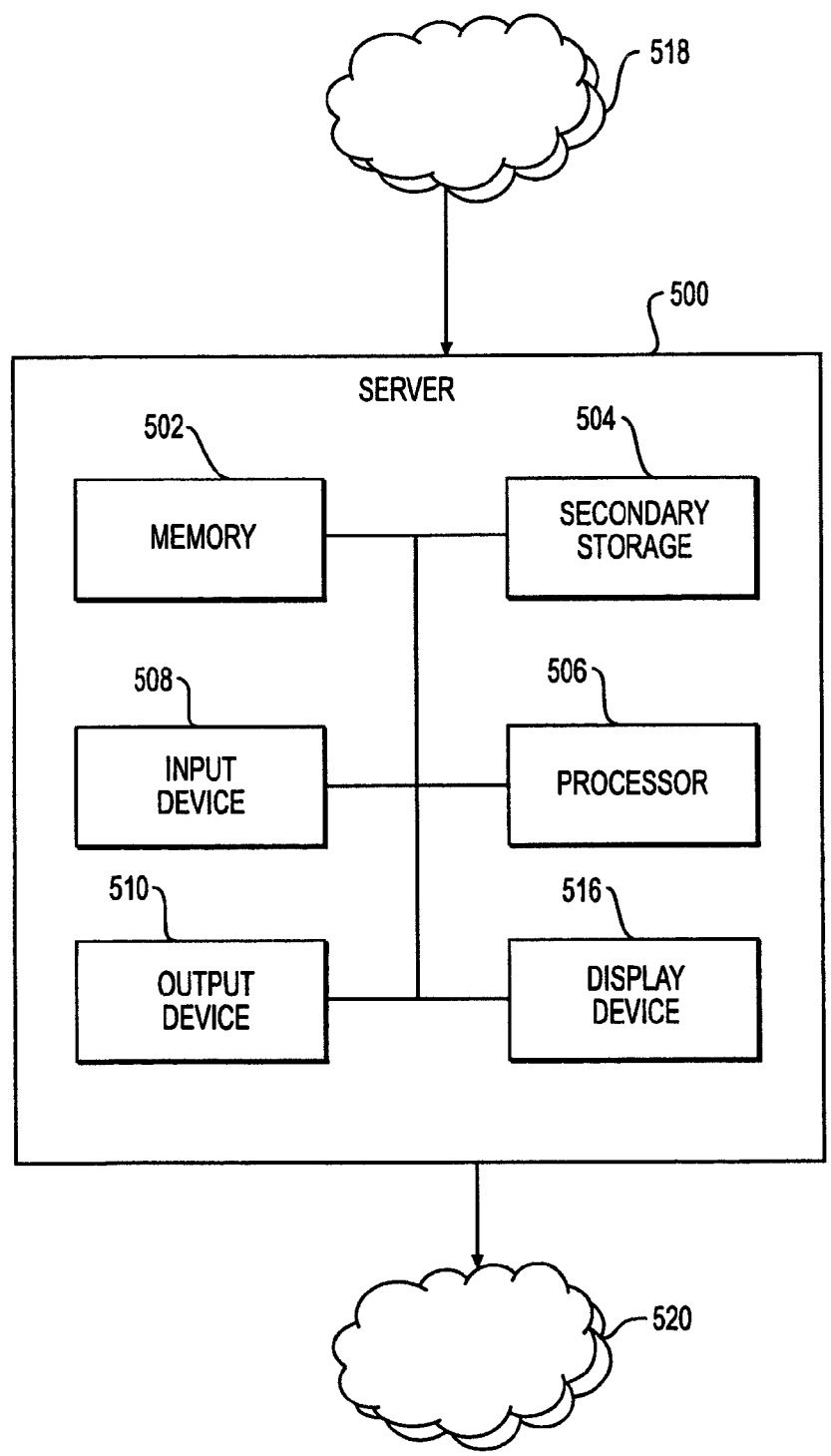
FIG. 5 is a diagram illustrating an embodiment of hardware for a system for sharing information across security boundaries.

With reference to FIG. 5, shown is a server 500 that may include an embodiment of system 300/310 for sharing information between networks 518 and 520 across security boundaries (e.g., SHAG 100). Server 500 typically includes a memory 502, a secondary storage device 504, a processor 506, an input device 508, and an output device 510. Memory 502 may include RAM or similar types of memory, and it may store one or more applications (e.g., SHAG 100) for execution by processor 506. Secondary storage device 504 may include a hard disk drive, floppy disk drive, CD-ROM drive, or other types of non-volatile data storage. Processor 506 executes the application(s), which is stored in memory 502 or secondary storage 504, or received from the Internet or other network. Input device 508 may include any device for entering information into server 500, such as a keyboard, mouse, cursor-control device, touch-screen, microphone, digital camera, video recorder or camcorder. Output device 510 may include any type of device for presenting a hard copy of information, such as a printer, and other types of output devices include speakers or any device for providing information in audio form. Display 516 may include a screen, such as a monitor.

Server 500 may store a database structure in secondary storage 504, for example, for storing and maintaining information need or used by the embodiments described herein. Also, processor 506 may execute one or more software applications in order to provide the functions described in this specification, specifically in the methods described above, and the processing may be implemented in software, such as software modules, for execution by computers or other machines. The processing may provide and support web pages and other GUIs. The GUIs may be formatted, for example, as web pages in HyperText Markup Language (HTML), Extensible Markup Language (XML) or in any other suitable form for presentation on a display device.

Although server 500 is depicted with various components, one skilled in the art will appreciate that the servers can contain additional or different components. In addition, although aspects of an implementation consistent with the above are described as being stored in memory, one skilled in the art will appreciate that these aspects can also be stored on or read from other types of computer program products or computer-readable media, such as secondary storage devices, including hard disks, floppy disks, or CD-ROM; a carrier wave from the Internet or other network; or other forms of RAM or ROM. The computer-readable media may include instructions for controlling a computer system, such as server 500, to perform a particular method.

The embodiments of systems and methods for sharing information described herein have several advantages over current information sharing systems for real-life applications. In current systems, the translation of releasability policies into logical rules must be done by a human expert. In current systems, these policies need to be construed and twisted into cumbersome selection statements, but in the embodiments described herein, the logical rules very closely mirror the way policies are already stated in plain English. In current systems, the human expert needs to anticipate what might appear in the data in many cases because rules used in current information sharing systems are proscriptive. In the embodiments described herein no such anticipation is needed; the author of a rule simply states what is not allowed, just like the releasability policy already states. Therefore, crafting rules for the embodiments described herein is a more natural process and can be a very straightforward translation.

In addition, the embodiments described herein are self-correcting. If there is any inconsistency or conflict within the rule set, for example a logical combination that restricts all data, or one that allows all data, the system will not operate. In current information sharing systems, no such self-check is possible. The embodiments described herein also contain internal checks and additional filters 328 to make sure non-releasable data is not accidentally released (for example, if the data falls outside the scope of the rule set).

The embodiments described herein ensure high assurance which is enabled by the use of a theorem prover. The soundness of the theorem prover ensures that the embodiments described herein redaction decisions are correct. The completeness of the theorem prover ensures that all logical inconsistencies will be found and in combination with the structure of the rules and ontology of the embodiments described herein, ensures that all redactions on a data set will be performed (i.e., no non-releasable data will be released).

In an embodiment of the system and method for information sharing, the software for the inference engine may be stored in memory and run on a general purpose processor. It is also possible and perhaps even desirable, for security reasons, to have all or part of the inference engine and/or policies implemented on a field programmable gate array (FPGA) or other firmware or hardware mechanism.

The method for information sharing described above can be embodied on any computer-readable medium. For example, instructions for executing the method may be stored on the memory of the server.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated.

The invention claimed is:

1. A system for sharing information across security boundaries comprising:
    a server including a processor and a memory, the memory including:
        rules which include rules and instructions for classifying and otherwise handling facts that may be contained within semantic statements in data;
        ontology which is a specification of concepts and relationships between the concepts; and
    wherein the memory further includes instructions executed by the processor to provide:
        theorem prover, wherein when the instructions are executed by the processor the theorem prover:
            processes a semantic statement from data with the rules and ontology;
            determines whether the semantic statement is consistent with the rules and ontology;
            determines a fact that gives rise to an inconsistency if the semantic statement is inconsistent;
            removes the fact that gives rise to the inconsistency; and
            releases data when the semantic statement is consistent with the rules and ontology.

2. The system of claim 1, wherein the theorem prover further:
    repeats determining whether the semantic statement is consistent with the rules and ontology, determines an additional fact that gives rise to an inconsistency if the semantic statement is inconsistent, and removes the additional fact that gives rise to the inconsistency until the semantic statement is consistent.

3. The system of claim 1, wherein the theorem prover further:
    determines whether there are any additional semantic statements;
    if there are additional semantic statements, the theorem prover further:
        determines whether an additional semantic statement is consistent with the rules and ontology;
        determines a fact from the additional semantic statement that gives rise to an inconsistency if the additional semantic statement is inconsistent;
        removes the fact from the additional semantic statement that gives rise to the inconsistency for the additional semantic statement; and
        repeats the preceding until no semantic statements remain.

4. The system of claim 1, wherein the theorem prover is an OWL (Web Ontology Language) reasoner, the data is represented in RDF (Resource Description Framework), and the rules and ontology are represented as an OWL ontology.

5. The system of claim 1, wherein releasing the data further comprises releasing a reference to original sources from which the data was derived.

6. The system as in claim 1, further comprising a one-way-transfer mechanism for increasing the assurance of the system when sharing information across security boundaries.

7. The system as in claim 1, wherein the executed instructions further provide means for detecting incorrect security labels on data.

8. The system as in claim 1, wherein the executed instructions further provide an information-extraction mechanism for extracting the data from unstructured text.

9. A system for sharing information across security boundaries comprising:
a server for sharing information between networks comprising:
a processor;
a memory, wherein the memory includes instructions for:
receiving data structured as semantic statements;
retrieving a set of rules, ontology and aggregation history;
processing a semantic statement from data with the rules, ontology and aggregation history;
determining whether the semantic statement is consistent with the rules, ontology, and aggregation history;
determining a fact that gives rise to an inconsistency if the semantic statement is inconsistent;
removing the fact that gives rise to the inconsistency; and
releasing data when the semantic statement is consistent with the rules, ontology, and aggregation history.

10. The system of claim 9, further comprising:
repeating determining whether the semantic statement is consistent with the rules and ontology, determining an additional fact that gives rise to an inconsistency if the semantic statement is inconsistent, and removing the additional fact that gives rise to the inconsistency until the semantic statement is consistent.

11. The system of claim 9, further comprising:
determining whether there are any additional semantic statements;
if there are additional semantic statements, processing an additional semantic statement from the data with the rules and ontology, determining whether the additional semantic statement is consistent with the rules and ontology, determining a fact from the additional semantic statement that gives rise to an inconsistency if the additional semantic statement is inconsistent, removing the fact from the additional semantic statement that gives rise to the inconsistency for the additional semantic statements, and repeating the preceding until no semantic statements remain.

12. A method for sharing information across security boundaries comprising:
receiving data structured as semantic statements;
retrieving a set of rules and ontology;
providing a theorem prover for:
processing a semantic statement from data with the rules and ontology;
determining whether the semantic statement is consistent with the rules and ontology;
determining a fact that gives rise to an inconsistency if the semantic statement is inconsistent;
removing the fact that gives rise to the inconsistency; and
releasing data when the semantic statement is consistent with the rules and ontology.

13. The method of claim 12, wherein the theorem prover further performs:
repeating determining whether the semantic statement is consistent with the rules and ontology, determining an additional fact that gives rise to an inconsistency if the semantic statement is inconsistent, and removing the additional fact that gives rise to the inconsistency until the semantic statement is consistent.

14. The method of claim 12, wherein the theorem prover further performs:
determining whether there are any additional semantic statements;
if there are additional semantic statements:
processing an additional semantic statement from the data with the rules and ontology;
determining whether the additional semantic statement is consistent with the rules and ontology;
determining a fact from the additional semantic statement that gives rise to an inconsistency if the additional semantic statement is inconsistent;
removing the fact from the additional semantic statement that gives rise to the inconsistency; and
repeating the preceding until no semantic statements remain.

15. The method of claim 14, wherein the theorem prover further performs applying filters to semantic statements.

16. The method of claim 14, wherein releasing the data further comprises releasing a reference to original sources from which the data was derived.

17. A method for sharing information across security boundaries comprising:
receiving data structured as semantic statements;
retrieving a set of rules and ontology;
retrieving aggregation history;
processing a semantic statement from data with the rules, ontology and aggregation history;
determining whether the semantic statement is consistent with the rules, ontology, and aggregation history;
determining a fact that gives rise to an inconsistency if the semantic statement is inconsistent;
removing the fact that gives rise to the inconsistency; and
releasing data when the semantic statement is consistent with the rules, ontology, and aggregation history.

18. The method of claim 17, further comprising:
repeating determining whether the semantic statement is consistent with the rules and ontology, determining an additional fact that gives rise to an inconsistency if the semantic statement is inconsistent, and removing the additional fact that gives rise to the inconsistency until the semantic statement is consistent.

19. The method of claim 17, further comprising:
determining whether there are any additional semantic statements;
if there are additional semantic statements, processing an additional semantic statement from the data with the rules and ontology, determining whether the additional semantic statement is consistent with the rules and ontology, determining a fact from the additional semantic statement that gives rise to an inconsistency if the additional semantic statement is inconsistent, removing the fact from the additional semantic statement that gives rise to the inconsistency, and repeating the preceding until no semantic statements remain.

* * * * *